US011921292B2

(12) United States Patent
Nicholson et al.

(10) Patent No.: US 11,921,292 B2
(45) Date of Patent: Mar. 5, 2024

(54) SYSTEMS, DEVICES, AND METHODS FOR WAVEGUIDE-BASED EYEBOX EXPANSION IN WEARABLE HEADS-UP DISPLAYS

(71) Applicant: GOOGLE LLC, Mountain View, CA (US)

(72) Inventors: Stuart James Myron Nicholson, Waterloo (CA); Timothy Paul Bodiya, Toronto (CA); Stefan Alexander, Elmira (CA)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 17/517,290

(22) Filed: Nov. 2, 2021

(65) Prior Publication Data
US 2022/0057637 A1 Feb. 24, 2022

Related U.S. Application Data

(63) Continuation of application No. 16/143,025, filed on Sep. 26, 2018, now Pat. No. 11,175,506.
(Continued)

(51) Int. Cl.
*G02B 27/01* (2006.01)
*F21V 8/00* (2006.01)
(Continued)

(52) U.S. Cl.
CPC ......... *G02B 27/0172* (2013.01); *G02B 6/00* (2013.01); *G02B 6/0013* (2013.01);
(Continued)

(58) Field of Classification Search
CPC ............ G02B 27/0172; G02B 27/0081; G02B 27/0176; G02B 27/0179; G02B 2027/015; G02B 2027/0174; G02B 2027/0178; G02B 2027/0179; G02B 6/00; G02B 6/0013; G02B 6/0033
(Continued)

(56) References Cited

U.S. PATENT DOCUMENTS

2014/0300966 A1* 10/2014 Travers ................ G02B 6/0035
359/558
2016/0026253 A1* 1/2016 Bradski ................ H04N 13/128
345/8
(Continued)

*Primary Examiner* — Collin X Beatty (57) ABSTRACT

Systems, devices, and methods for eyebox expansion in wearable heads-up displays ("WHUDs") are described. The WHUDs described herein each include a projector and an optical waveguide positioned in an optical path between the projector and an eye of the user. For any given light signal from the projector, the optical waveguide receives the light signal at an input coupler and outputs multiple instances or copies of the light signal from multiple discrete, spatially-separated output couplers. The multiple instances or copies of the light signal may be converged by the optical waveguide directly to respective exit pupils at the user's eye or may be routed by the optical waveguide to a holographic combiner in the user's field of view from which the light signals may be converged to respective exit pupils at the user's eye. The optical waveguide employs exit pupil replication to expand the eyebox of the WHUD.

19 Claims, 4 Drawing Sheets

Related U.S. Application Data

(60) Provisional application No. 62/564,858, filed on Sep. 28, 2017.

(51) Int. Cl.
 *G02B 6/00* (2006.01)
 *G02B 27/00* (2006.01)

(52) U.S. Cl.
 CPC ....... *G02B 6/0033* (2013.01); *G02B 27/0081* (2013.01); *G02B 27/0176* (2013.01); *G02B 27/0179* (2013.01); *G02B 2027/015* (2013.01); *G02B 2027/0174* (2013.01); *G02B 2027/0178* (2013.01); *G02B 2027/0187* (2013.01)

(58) Field of Classification Search
 USPC .......................................................... 359/13
 See application file for complete search history.

(56) References Cited

U.S. PATENT DOCUMENTS

2016/0357016 A1* 12/2016 Cakmakci .......... G02B 27/0172
2017/0235143 A1*  8/2017 Chi .................... G02B 26/0833
                                                      359/204.2

\* cited by examiner

SYSTEMS, DEVICES, AND METHODS FOR WAVEGUIDE-BASED EYEBOX EXPANSION IN WEARABLE HEADS-UP DISPLAYS

CROSS-REFERENCE TO RELATED APPLICATIONS

The present application is a continuation application of U.S. patent application Ser. No. 16/143,025, entitled "SYSTEMS, DEVICES, AND METHODS FOR WAVEGUIDE-BASED EYEBOX EXPANSION IN WEARABLE HEADS-UP DISPLAYS" and filed on Sep. 26, 2018, which claims the priority to U.S. Provisional Application Ser. No. 62/564,858, entitled "SYSTEMS, DEVICES, AND METHODS FOR WAVEGUIDE-BASED EYEBOX EXPANSION IN WEARABLE HEADS-UP DISPLAYS" and filed on Sep. 28, 2017, the entirety of each above-referenced application incorporated by reference herein.

TECHNICAL FIELD

The present systems devices, and methods generally relate to wearable heads-up display technologies and particularly relate to expanding the eyebox of a wearable heads-up display.

BACKGROUND

Description of the Related Art

Wearable Heads-Up Displays

A head-mounted display is an electronic device that is worn on a user's head and, when so worn, secures at least one electronic display within a viewable held of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display may be summarized as including: a support structure that in use is worn on a head of a user; an eyeglass lens carried by the support structure and positioned in a field of view of an eye of the user when the support structure is worn on the head of the user, a projector to project light, the projector carried by the support structure; an optical waveguide carried by the support structure, wherein the optical waveguide comprises: an input coupler carried by the optical waveguide and positioned in an optical path of light projected by the projector, the input coupler oriented to couple light from the projector into the optical waveguide; a first output coupler carried by the optical waveguide, the first output coupler oriented to couple a first portion of light from the projector out of the optical waveguide and direct the first portion of light to a first exit pupil at or proximate the eye of the user and a second output coupler carried by the optical waveguide, the second output coupler oriented to couple a second portion of light from the projector out of the optical waveguide and direct the second portion of light to a second exit pupil at or proximate the eye of the user.

The optical waveguide may be carried by the eyeglass lens and positioned at least partially within a field of view of an eye of the user when the support structure is worn on the head of the user. The first output coupler may be positioned within the field of view of the eye of the user when the support structure is worn on the head of the user and oriented to converge the first portion of light directly towards the first exit pupil at or proximate the eye of the user. The second output coupler may be positioned within the field of view of the eye of the user when the support structure is worn on the head of the user and oriented to converge the second portion of light directly towards the second exit pupil at or proximate the eye of the user. The projector may be carried by an arm portion of the support structure and oriented to project light through free space towards the eyeglass lens. The input coupler may be positioned within the field of view of the eye of the user when the support structure is worn on the head of the user and oriented to receive light from the projector.

The optical waveguide may be carried by an arm portion of the support structure and positioned substantially outside of a field of an eye of the user when the support structure is worn on the head of the user. In this case, the wearable heads-up display may further include: a holographic combiner carried by the eyeglass lens and positioned within the field of view of the eye of the user when the support structure is worn on the head of the user, the holographic combiner including at least one hologram, wherein: the first output coupler is positioned and oriented to direct the first portion of light through free space towards the holographic combiner; the second output coupler is positioned and oriented to direct the second portion of light through free space towards the holographic combiner; and the holographic combiner is positioned and oriented to: receive the first portion of light from the first output coupler; converge the first portion of light towards the first exit pupil at or proximate the eye of the user; receive the second portion of light from the second output coupler, and converge the second portion of light towards the second exit pupil at or proximate the eye of the user. The holographic combiner may be integrated with the eyeglass lens.

The optical waveguide may be positioned and oriented to guide both the first portion of light and the second portion of light towards the first output coupler, and the first output coupler may be oriented to redirect the second portion of light towards the second output coupler through the optical waveguide. The first output coupler may be at least partially reflective of the first portion of light and at least partially transmissive of the second portion of light.

The optical waveguide may be positioned and oriented to guide the first portion of light directly towards the first output coupler without impinging on the second output coupler and to guide the second portion of light directly towards the second output coupler without impinging on the first output coupler.

At least one of the input coupler, the first output coupler, and the second output coupler may be selected from a group consisting of: an optical grating, a diffraction grating, a hologram, and a holographic optical element comprising at least two holograms. The optical waveguide may be integrated with the eyeglass lens. The optical waveguide may include a single optical channel through which the first portion of light and the second portion of light are both guided. Alternatively, the optical waveguide may include a first optical channel through which the first portion of light is guided towards the first output coupler and a second optical channel through which the second portion of light is guided towards the second output coupler, wherein the first portion of light is not guided through the second optical channel and the second portion of light is not guided through the first optical channel.

The wearable heads-up display may further include: N output couplers carried by the optical waveguide, wherein N is an integer greater than 2, and wherein each respective one of the N output couplers is oriented to couple a respective portion of light from the projector out of the optical waveguide and direct the respective portion of light to a respective one of N exit pupils at or proximate the eye of the user. The N output couplers may be arranged in a single row across a length of the optical waveguide, and each of the N output couplers may be at least partially reflective to couple a respective portion of light from the projector out of the optical waveguide and direct the respective portion of light to a respective one of the N exit pupils at or proximate the eye of the user. Each of at least N−1 of the output couplers may be partially transmissive to transmit a respective portion of light from the projector through the optical waveguide towards at least one other one of the N output couplers.

Alternatively, the N output couplers may be arranged in an array having P>1 rows and Q>1 columns. The optical waveguide may be positioned and oriented to guide a respective portion of light from the projector to each respective one of the N output couplers. The Q output couplers in each respective one of the P rows may be arranged in a row. Each of the Q output couplers in each of the P rows may be at least partially reflective to couple a respective portion of light from the projector out of the optical waveguide and direct the respective portion of light to a respective one of the N exit pupils at or proximate the eye of the user. Each of at least Q−1 of the Q output couplers in each of the P rows may be partially transmissive to transmit a respective portion of light from the projector through the optical waveguide towards at least one other one of the Q output couplers in the row. The optical waveguide may include P optical channels and each of the P rows may correspond to a respective one of the P channels.

The projector may include a scanning laser projector. The support structure may have a general shape and appearance of an eyeglasses frame.

The input coupler may be a first input coupler, and the wearable heads-up display may further include a second input coupler oriented to couple light from the projector into the optical waveguide, wherein the first input coupler is positioned and oriented to couple the first portion of light from the projector into the optical waveguide and direct the first portion of light from the projector towards the first output coupler and the second input coupler is positioned and oriented to couple the second portion of light from the projector into the optical waveguide and direct the second portion of light from the projector towards the second output coupler.

An optical waveguide may be summarized as including: a volume of optically transparent material; a first input coupler carried by the volume of optically transparent material and positioned and oriented to couple light from a light source into the volume of optically transparent material; a first output coupler carried by the volume of optically transparent material, the first output coupler positioned and oriented to couple a first portion of light from the light source out of the volume of optically transparent material and direct the first portion of light to a first exit pupil; and a second output coupler carried by the volume of optically transparent material and spatially-separated from the first output coupler, the second output coupler positioned and oriented to couple a second portion of light from the light source out of the volume of optically transparent material and direct the second portion of light to a second exit pupil, the second exit pupil spatially-separated from the first exit pupil.

The volume of optically transparent material may be positioned and oriented to guide both the first portion of light and the second portion of light towards the first output coupler, and the first output coupler may be oriented to redirect the second portion of light towards the second output coupler through the volume of optically transparent material. The first output coupler may be at least partially reflective of the first portion of light and at least partially transmissive of the second portion of light.

The volume of optically transparent material may be positioned and oriented to guide the first portion of light directly towards the first output coupler without impinging on the second output coupler and to guide the second portion of light directly towards the second output coupler without impinging on the first output coupler.

At least one of the first input coupler, the first output coupler, and the second output coupler may be selected from a group consisting of: an optical grating, a diffraction grating, a hologram, and a holographic optical element comprising at least two holograms.

The optical waveguide may further include an eyeglass lens, wherein the volume of optically transparent material is integrated with the eyeglass lens.

The volume of optically transparent material may in a single optical channel through which the first portion of light and the second portion of light are both guided. Alternatively, the volume of optically transparent material may include a first optical channel through which the first portion of light is guided towards the first output coupler and a second optical channel through which the second portion of light is guided towards the second output coupler, wherein the first portion of light is not guided through the second optical channel and the second portion of light is not guided through the first optical channel.

The optical waveguide may further include N output couplers carried by the volume of optically transparent material, wherein N is an integer greater than 2, and wherein each respective one of the N output couplers is oriented to couple a respective portion of light from the light source out of the volume optically transparent material and direct the respective portion of light to a respective one of N exit pupils. The N output counters may be arranged in a single row across a length of the volume of optically transparent material, wherein each of the N output couplers is at least partially reflective to couple a respective portion of light from the light source out of the volume of optically transparent material and direct the respective portion of light to a respective one of the N exit pupils, and each of at least N–1 of the output couplers is partially transmissive to transmit a respective portion of light from the light source through the volume of optically transparent material towards at least one other one of the N output couplers. Alternatively, the N output couplers may be arranged in an array having P>1 rows and Q>1 columns, wherein: the volume of optically transparent material is positioned and oriented to guide a respective portion of light from the light source to each respective one of the N output couplers; the Q output couplers in each respective one of the P rows are arranged in a row; each of the Q output couplers in each of the P rows is at least partially reflective to couple a respective portion of light from the light source out of the volume of optically transparent material and direct the respective portion of light to a respective one of the N exit pupils; and each of at least Q–1 of the Q output couplers in each of the P rows is partially transmissive to transmit a respective portion of light from the light source through the volume of optically transparent material towards at least one other one of the Q output couplers in the row. The volume of optically transparent material may include P optical channels and each of the P rows may correspond to a respective one of the P channels.

The optical waveguide may further include a second input coupler oriented to couple light from the light source into the volume of optically transparent material, wherein the first input coupler is positioned and oriented to couple the first portion of light from the light source into the volume of optically transparent material and direct the first portion of light from the light source towards the first output coupler and the second input coupler is positioned and oriented to couple the second portion of light from the light source into the volume of optically transparent material and direct the second portion of light from the light source towards the second output coupler.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for eyebox expansion in wearable heads-up displays ("WHUDs"). Particularly, the various embodiments described in the present systems, devices, and methods provide optical waveguide-based structures and techniques that are operable to expand the eyebox of a projector-based WHUD. For the purposes of the present systems, devices, and methods, a "projector" is any light or image source that functions by projecting light or images directly to at least one eye of a user and includes, without limitation: a scanning laser projector, a digital light processor or "DLP"-based projector, an LCD- or SLM-based projector, and/or a LED-based projector.

Generally, a projector-based WHUD is a form of virtual retina display in which a projector projects an image (e.g., draws a raster scan in the case of a scanning laser projector), either directly or through any number of intervening optics, onto the eye of the user. In the absence of any further measure the projector projects light over a fixed area called the exit pupil of the display. In order for the user to see displayed content the exit pupil of the display typically needs to align with, be encompassed by, or overlap with the entrance pupil of the user's eye. The full scan range of the projector (i.e., the full resolution and/or field of view of the display) is visible to the user when the exit pupil of the display is completely contained within the entrance pupil of the eye. For this reason, a projector-based WHUD typically employs a relatively small exit pupil that is equal to or smaller than the expected size of the entrance pupil of the user's eye (e.g., less than or equal to about 4 mm in diameter).

The eyebox of a projector-based WHUD is defined, at least in part, by the geometry of one or more exit pupil(s) of the display at or proximate the eye of the user. A projector-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead, but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of projector-based WHUD may be expanded by optically replicating and/or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's entrance pupil for each of a range of eye positions corresponding to a range of gaze directions of the user. In other words, the present systems, devices, and methods describe eyebox expansion by exit pupil replication in projector-based WHUDs.

Throughout this specification and the appended claims, the term "replication" is used (e.g., in the context of "exit pupil replication") to generally refer to situations where multiple instances of substantially the same thing (e.g., an exit pupil) are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil.

The various embodiments described herein may at least partially employ and/or may be implemented instead of, in addition to, or in combination with, the systems, devices, and methods described in US Patent Application Publication No. US 2016-0377865 A1, US Patent Application Publication No. US 2016-0377866 A1, and/or US Patent Application Publication No. US 2016-0238845 A1. In some implementations, the present systems, devices, and methods provide a combination of the "splitting" and "replicating" concepts described in the above-listed patent publications.

Figure 1:
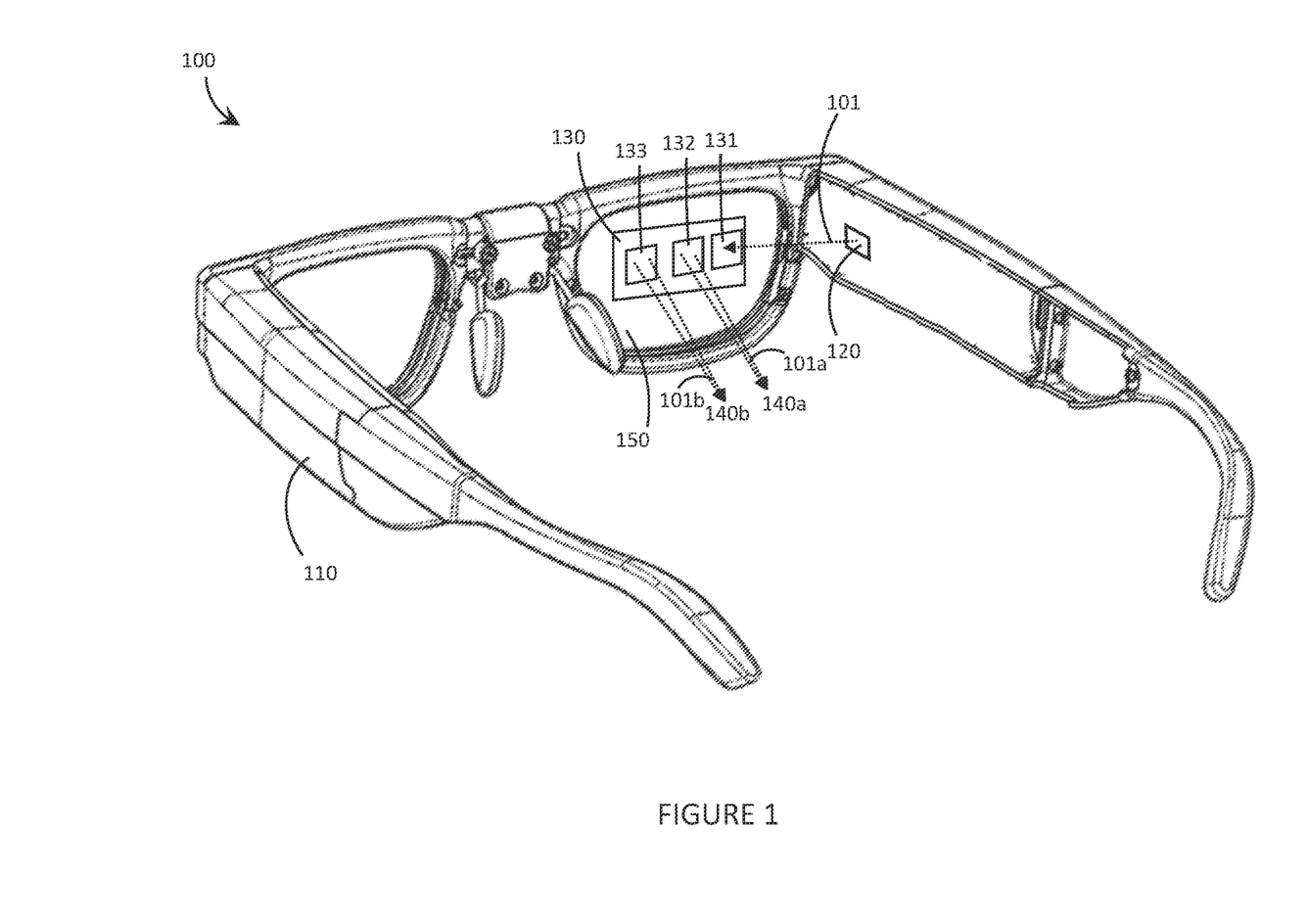
FIG. 1 is a partial-cutaway perspective view of a wearable heads-up display that provides a large eyebox made up of multiple optically-replicated exit pupils in accordance with the present systems, devices, and methods.

FIG. 1 is a partial-cutaway perspective view of a WHUD 100 that provides a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including a projector 120 and an optical waveguide 130. Projector 120 may include a scanning laser projector as previously described. Optical waveguide 130 itself includes an input coupler 131, a first output coupler 132, and at least a second output coupler 133. At least one of the input coupler, the first output coupler, and the second output coupler is selected from a group consisting of an optical grating, a diffraction grating, a hologram, and a holographic optical element comprising at least two holograms.

A person of skill in the art will appreciate that optical waveguide 130 may include an optical fiber or a rectangular waveguide or lightguide formed of a volume of optically transparent material such as glass or polymer.

Projector 120, in operation, projects display light 101 towards optical waveguide 130. Input coupler 131 of optical waveguide 130 is positioned in an optical path of projector 120 (i.e., in an optical path of light 101 from projector 120) and oriented to couple light 101 from projector 120 into optical waveguide 130. Light 101 is then propagated through an inner volume of optical waveguide 130 (e.g., via total internal reflection) until it encounters first output coupler 132. First output coupler 132 is oriented to: i) couple a first portion 101a of light 101 from projector 120 out of optical waveguide 130, and ii) direct first portion 101a of light 101 to a first exit pupil 140a at or proximate the eye of the user (not shown to reduce clutter).

At least a second portion 101b of light 101 is propagated through optical waveguide 130 until it encounters second output coupler 133. Second output coupler 133 is oriented to: i) couple second portion 101b of light 101 from projector 120 out of optical waveguide 130, and ii) direct second portion 101b of light 101 to a second exit pupil 140b at or proximate the eye of the user.

Thus, respective first and second portions 101a, 101b of the same display light 101 are replicated and routed to respective exit pupils 140a and 140b at or proximate the eye of the user. First exit pupil 140a and second exit pupil 140b are spatially separated from one another at or proximate the eye of the user and, therefore, in combination provide an expanded eyebox relative to the size of the eyebox corresponding to either first exit pupil 140a or second exit pupil 140b on its own.

Generally, support structure 110 carries an eyeglass lens 150 positioned in the field of view of the eye of the user when support structure 110 is worn on the head of the user. Eyeglass lens 150 may include, for example, a prescription eyeglass lens. In the illustrated embodiment of FIG. 1, optical waveguide 130 is integrated with eyeglass lens 150 and positioned at least partially within the field of view of the eye of the user when support structure 110 is worn on the head of the user. In this configuration, input coupler 131 is positioned within the field of view of the eye of the user when support structure 110 is worn on the head of the user, and display light 101 is projected from an arm portion of support structure 110, through free space, to impinge on input coupler 131 and couple into optical waveguide 130 therethrough. For the purposes of the present systems, devices, and methods, the term "free space" is used to refer to a three dimensional volume that is outside of (i.e., external to) the various systems and devices described herein. For example, in FIG. 1 "free space" refers to the volume outside of (i.e., external to) wearable heads-up display 100, and includes the portion of the optical path of light 101 that extends from projector 120 to input coupler 131 between the arm portion of support structure 10 and eyeglass lens 150.

Similar to input coupler 131, first output coupler 132 is also positioned within the field of view of the eye of the user when support structure 110 is worn on the head of the user and oriented to converge first portion 101a of light 101 directly (i.e., with no intervening optics) towards first exit pupil 140a at or proximate the eye of the user, and second output coupler 133 is also positioned within the field of view of the eye of the user when support structure 110 is worn on the head of the user and oriented to converge second portion 101b of light 101 directly (i.e., with no intervening optics) towards second exit pupil 140b at or proximate the eye of the user.

The configuration described above and illustrated in FIG. 1 may employ systems, devices, and/or methods of integrating waveguide structures with curved eyeglass lenses, such as for example those described in U.S. Provisional Patent Application Ser. No. 62/482,062 (now U.S. patent application Ser. Nos. 15/946,549, 15/946,557, 15/946,562, 15/946,565, and 15/946,569). However, in some implementations (e.g., where a prescription of lens 150 renders integration of waveguide 130 therewith difficult) it may be advantageous to employ an alternative implementation such as that described in FIG. 2.

Figure 2:
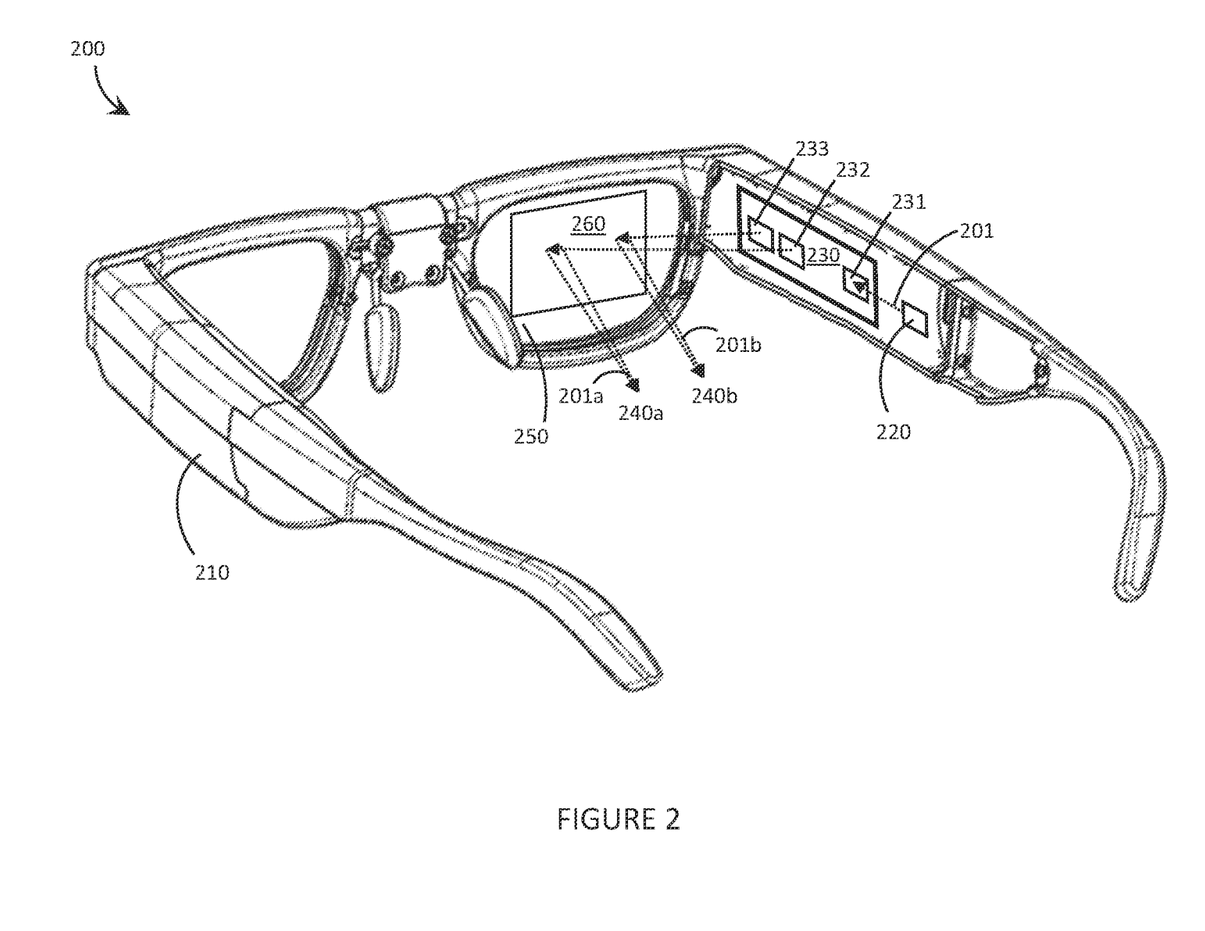
FIG. 2 is a partial-cutaway perspective view of a wearable heads-up display that provides a large eyebox made up of multiple optically-replicated exit pupils in accordance with the present systems, devices, and methods.

FIG. 2 is a partial-cutaway perspective view of a WHUD 200 that provides a large eyebox made up of multiple replicated exit pupils in accordance with the present systems, devices, and methods. WHUD 200 is substantially similar to WHUD 100 from FIG. 1 in that it includes a support structure 210 that in use is worn on the head of a user and has a general shape and appearance of an eyeglasses (e.g., sunglasses) frame and that support structure 210 carries a projector 220 and an optical waveguide 230. However, WHUD 200 is distinct from WHUD 100 in that optical waveguide 230 is positioned substantially outside of the field of view of the eye of the user when support structure 210 is worn on the head of the user, and in that WHUD 200 includes a holographic combiner 260.

Holographic combiner 260 is carried by support structure 210 and is positioned within the field of view of the eye of the user when support structure 210 is worn on the head of the user. Holographic combiner 260 includes at least one hologram, is integrated with eyeglass lens 250, and may implement any or all of the systems, devices, and methods described in US Patent Application Publication No. US 2017-0212349 A1, US Patent Application Publication No. US 2016-0327797 A1, US Patent Application Publication No. US 2016-0327796 A1, US Patent Application Publication No. US 2016-0349516 A1. US Patent Application Publication No. US 2017-0068095 A1, US Patent Application Publication No. US 2017-0212290 A1, US Patent Application Publication No. US 2017-0219829 A1, U.S. Provisional Patent Application Ser. No. 62/487,303, and/or U.S. Provisional Patent Application Ser. No. 62/534,099.

In the configuration of WHUD 200, optical waveguide 230 is positioned substantially outside of the users field of view (e.g., on an arm or temple of support structure 210). Though similar to optical waveguide 130 of MUD 100, optical waveguide 230 of WHUD 200 still includes input coupler 231, first output coupler 232, and et least second output coupler 233. In WHUD 100, first output coupler 132 and second output coupler 133 each converge respective portions 101a, 101b of light 101 directly (i.e., without any intervening optics) towards respective exit pupils 140a, 140b at or proximate the eye of the user. In WHUD 200, first output coupler 232 and second output coupler 233 also direct respective portions 201a, 201b of light 201 from projector 220 to respective exit pupils 240a, 240b at or proximate the eye of the user, but in the configuration of WHUD 200 the optical paths of first and second light portions 201a, 201b are both interrupted by holographic combiner 260 in between output couplers 232, 233 and exit pupils 240a, 240b. In other words, first output coupler 232 is positioned and oriented to direct first portion 201a of light 201 towards holographic combiner 260 and second output coupler 233 is positioned and oriented to direct second portion 201b of light 201 towards holographic combiner 260. First output coupler 232 and second output coupler 233 may or may not respectively converge first and second portions 201a, 201b of light 201. Holographic combiner 260 itself is positioned and oriented to: i) receive first portion 201a of light 201 from first output coupler 232 and converge first portion 201a of light 201 towards first exit pupil 240a at or proximate the eye of the user; and ii) receive second portion 201b of light 201 from second output coupler 233 and converge second portion 201b of light 201 towards second exit pupil 240b at or proximate the eye of the user. That is, holographic combiner 260 mediates propagation of light 201 in between optical waveguide 230 (specifically, output couplers 232 and 233 thereof) and the exit pupils (240a, 240b) of WHUD 200.

The configuration of WHUD 200 may be similar to that described in US Patent Publication US 2016-0377865 A1 with optical waveguide 230 serving as the "optical replicator," or similar to that described in US Patent Publication US 2016-0377866 A1 with optical waveguide 230 serving as the "optical splitter" or similar to a combination of the configurations described in US Patent Publications US 2016-0377865 A1 and US 2016-0377866 A1 with optical waveguide 230 combining the functions of both the "optical replicator" and the "optical splitter." Whether optical waveguide 230 functions more like an "optical replicator," an "optical splitter," or a combination of an optical replicator and an optical splitter depends on the specific implementation.

For example, optical waveguide 230 may be designed to operate as an "optical replicator" as follows: optical waveguide 230 may be positioned and oriented to guide (e.g., via total internal reflection) light 201 from input coupler 231 towards first output coupler 232, where first output coupler 232 is oriented to redirect a first portion 201a of light 201 out through free space towards holographic combiner 260 and to guide second portion 201b of light 201 through waveguide 230 towards second output coupler 233 (e.g. through an inner volume of optical waveguide 230 using, e.g., total internal reflection). In order to achieve this, first output coupler 232 may be, for example, at least partially reflective of first portion 201a of light 201 and at least partially transmissive of second portion 201b of light 201. Or more generally, first output coupler 232 may be: i) partially reflective of light 201 so as to out-couple first portion 201a of light 201 from optical waveguide 230 through free space towards holographic combiner 260; and ii) partially transmissive of light 201 so as to pass through second portion 201b of light 201, which then continues to propagate (e.g., via total internal reflection) through optical waveguide 230 to second output coupler 233, which then out-couples at least second portion 201b of light 201 through free space towards holographic combiner 260. In this way, a single input light signal 201 is replicated to produce two output light signals 201a, 201b that may generally correspond to replicated instances of the same image content.

A person of skill in the art will appreciate that this replication process may be generalized to any number N of output couplers. More generally, a WHUD architecture (e.g., WHUD 200) may be extended such that the optical waveguide (e.g., 230) includes N output couplers (e.g., 232, 233, . . . ) carried by the optical waveguide, where N is an integer greater than 2, and wherein each respective one of the N output couplers (e.g., 232, 233, . . . ) is oriented to couple a respective portion (e.g., 201a, 201b, . . . ) of light (e.g., 201) from the projector (e.g., 220) out of the optical waveguide (e.g., 230) towards holographic combiner 260, which then directs each respective portion of light (e.g., 201a, 201b, . . . ) to a respective one of N exit pupils (e.g., 240a, 240b, . . . ) at or proximate the eye of the user.

As another example, optical waveguide 230 may be designed to operate as an "optical splitter" as follows: optical waveguide 230 may be positioned and oriented to guide first portion 201a of light 201 from input coupler 231 directly towards first output coupler 232 without impinging on second output coupler 233 and to guide second portion 201b of light 201 from input coupler 231 directly towards second output coupler 233 without impinging on first output coupler 232. In other words, optical waveguide 230 may include and provide separate optical paths for first portion 201a of light 201 and second portion 201b of light 201. In the "optical replicator" example described above, optical waveguide 230 may include a single optical channel (e.g., a single conduit or rectangular waveguide volume through which lights propagated by total internal reflection) through which all light signals (e.g., light signal 201, first portion 201a, and second portion 201b) are propagated. By comparison, in this "optical splitter" example, optical waveguide 230 may include a first optical path or channel through which first portion 201a of light 201 is guided towards first output coupler 232 and a second optical path or channel through which second portion 201b of light 201 is guided towards second output coupler 233. In this case, first portion 201a of light 201 may not be guided through the second optical path or channel and second portion 201b of light 201 may not be guided through the first optical path or channel. In other words, light 201 from projector 220 may be split or divided by optical waveguide 230 (either within the volume of optical waveguide 230 or by one or more input coupler(s) 231) and routed to respective output couplers (232, 233) along separate optical pathways and/or through separate optical channels.

As described previously, the optical waveguides described herein (e.g., 130, 230) may include any number N of discrete, spatially-separated output couplers (232, 233) operable to out-couple N respective portions (201a, 201b) of light (201) from a projector (220) to (either directly or through intervening optics such as holographic combiner 260) N respective exit pupils (240a, 240b) at or proximate the eye of the user. These N output couplers may be arranged a number of different ways, including for example in a linear row or in a two-dimensional array.

When N discrete, spatially-separated output couplers (232, 233) are arranged in a single row across a length of an optical waveguide (230), each the N output couplers (232, 233) may be at least partially reflective (e.g., N−1 that are partially reflective, and one that is either partially or totally reflective) to couple a respective portion (201a, 201b) of light (201) from the projector (220) out of the optical waveguide (230) and direct (either directly or through any number of intervening optics) the respective portion (201a, 201b) of light (201) to a respective one of the N exit pupils (240a, 240b) at or proximate the eye of the user. Additionally, each of at least N−1 of the output couplers (232, 233) may be partially transmissive to transmit a respective portion (201a, 201b) of light (201) from the projector (220) through the optical waveguide (230) towards at least one other one of the N output couplers (232, 233). Such a configuration provides optical replication across a row within the optical waveguide, or an "optical waveguide replicator row." An illustrative example of this configuration for which N=6 is provided in FIG. 3.

Figure 3:
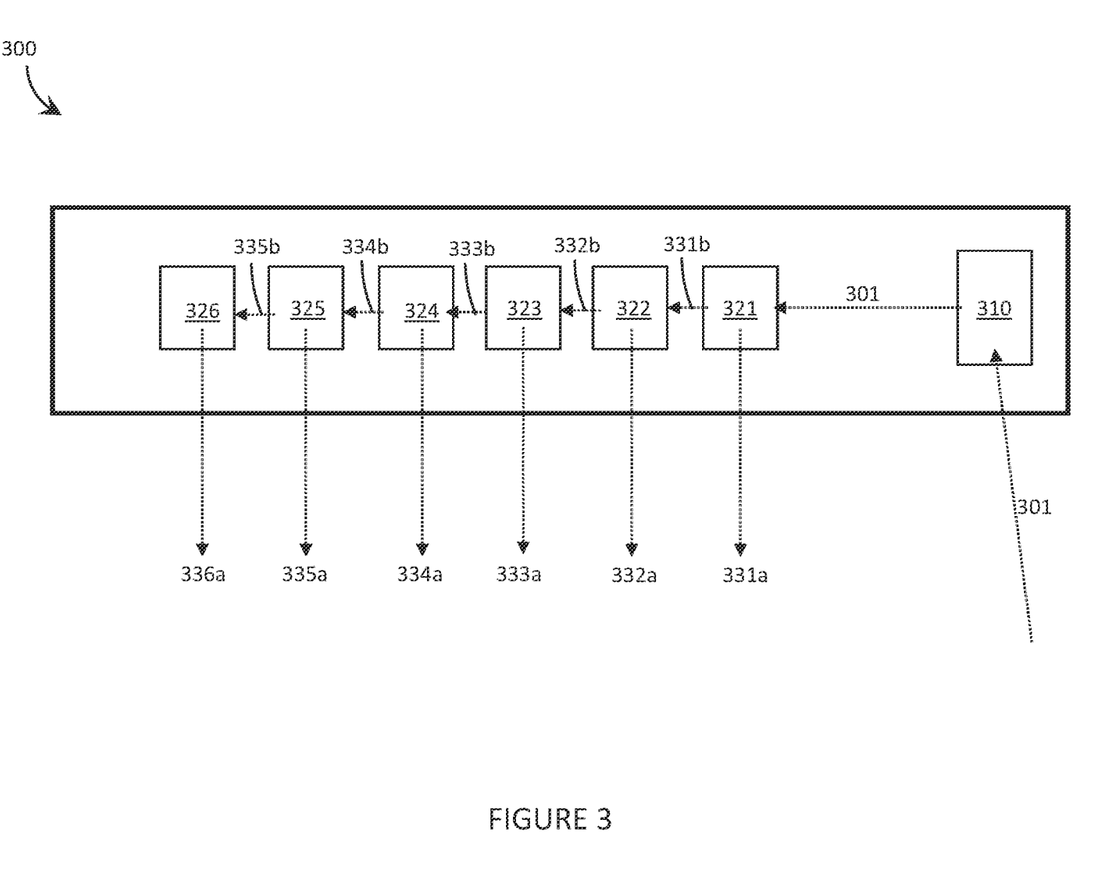
FIG. 3 is an illustrative diagram showing an example of an optical waveguide in accordance with the present systems, devices, and methods.

FIG. 3 is an illustrative diagram showing an example of optical waveguide 300 in accordance with the present systems, devices, and methods. Optical waveguide 300 is an optical waveguide replicator row for which N=6. Specifically, optical waveguide 300 includes an input coupler 310 and N=6 discrete, spatially-separated output couplers 321, 322, 323, 324, 325, and 326 arranged in a substantially linear row across the length of optical waveguide 300. Light 301 from a projector (not shown) is received by input coupler 310 and guided through the inner volume of optical waveguide 300 (e.g., via total internal reflection). Light 301 is guided (e.g., via total internal reflection) by optical waveguide 300 to first output coupler 321 which is partially reflective of light 301 and partially transmissive of light 301. A first portion 331a of light 301 that is reflected by first output coupler 321 is out-coupled from optical waveguide 300 towards (either directly or via any number of intervening optics such as holographic combiner 260) a first exit pupil at or proximate the eye of the user while a second portion 331b of light 301 that is transmitted by first output coupler 321 is propagated (e.g., via total internal reflection) by optical waveguide 300 to second output coupler 322. Light 331b is guided (e.g., via total internal reflection) by optical waveguide 300 to second output coupler 322 which is partially reflective of light 331b and partially transmissive of light 331b. A first portion 332a of light 331b that is reflected by second output coupler 322 is out-coupled from optical waveguide 300 towards (either directly or via any number of intervening optics such as holographic combiner 260) a second exit pupil at or proximate the eye of the user while a second portion 332b of light 331b that is transmitted by second output coupler 322 is propagated (e.g., via total internal reflection) by optical waveguide 300 to third output coupler 323. Light 332b is guided (e.g., via total internal reflection) by optical waveguide 300 to third output coupler 323 which is partially reflective of light 332b and partially transmissive of light 332b. A first portion 333a of light 332b that is reflected by third output coupler 323 is out-coupled from optical waveguide 300 towards (either directly or via any number of intervening optics such as holographic combiner 260) a third exit pupil at or proximate the eye of the user while a second portion 333b of light 332b that is transmitted by third output coupler 323 is propagated (e.g., via total internal reflection) by optical waveguide 300 to fourth output coupler 324. Light 333b is guided (e.g., via total internal reflection) by optical waveguide 300 to fourth output coupler 324 which is partially reflective of light 333b and partially transmissive of light 333b. A first portion 334a of light 333b that is reflected by fourth output coupler 324 is out-coupled from optical waveguide 300 towards (either directly or via any number of intervening optics such as holographic combiner 260) a fourth exit pupil at or proximate the eye of the user while a second portion 334b of light 333b that is transmitted by fourth output coupler 324 is propagated (e.g., via total internal reflection) by optical waveguide 300 to fifth output coupler 325. Light 334b is guided (e.g., via total internal reflection) by optical waveguide 300 to fifth output coupler 325 which is partially reflective of light 334b and partially transmissive of light 334b. A first portion 335a of light 334b that is reflected by fifth output coupler 325 is out-coupled from optical waveguide 300 towards (either directly or via any number of intervening optics such as holographic combiner 260) a fifth exit pupil at or proximate the eye of the user while a second portion 335b of light 334b that is transmitted by fifth output coupler 325 is propagated (e.g., via total internal reflection) by optical waveguide 300 to sixth output coupler 326. Light 335b is guided (e.g., via total internal reflection) by optical waveguide 300 to sixth output coupler 326 which is reflective (e.g., partially or fully reflective) of light 335b. Sixth output coupler 326 reflects and outcouples at least a portion 336a of light 335b towards (either directly or via any number of intervening optics such as holographic combiner 260) a sixth exit pupil at or proximate the eye of the user.

FIG. 3 shows an example of an optical waveguide configured to operate as an optical waveguide replicator row (with N=6 discrete, spatially-separated output couplers) as an eye ox expansion optic in a WHUD. For example, optical waveguide 300 may replace optical waveguide 130 from FIG. 1 directly in the user's field of view or may replace optical waveguide 230 from FIG. 2 as a replication input to holographic combiner 230. An advantage of having N discrete, spatially-separated output couplers in an optical waveguide replicator row as opposed to a single continuous output coupler is that each discrete, spatially-separated output coupler may be deliberately positioned and/or designed to output light in a specific and independent (e.g., unique) way (e.g., with a particular optical power or other optical function, directed towards a particular position, at a particular position relative to other output couplers such that outcoupling is partially based on output coupler position rather than solely total internal reflection angle, to outcouple only a specific wavelength, and so on). However, as previously described, the present systems, devices, and methods may be extended to include optical waveguides have two-dimensional arrays of output couplers.

Generally, the N output couplers may be arranged in an array having P>1 rows and Q>1 columns. In such implementations, the optical waveguide may include P optical paths or channels and be positioned and oriented to guide a respective portion of light from the projector along or into and through each respective one of the P optical pathways or channels. Q output couplers in each respective one of the P optical pathways or channels may be arranged in a single row across a length of the optical pathway or channel. Each of the Q output couplers in each of the P optical channels may be at least partially reflective (e.g., Q−1 that are partially reflective and one that is fully reflective) to couple a respective portion of light from the projector out of the optical waveguide and direct the respective portion of light (either directly or via an number of intervening optics) to a respective one of the N exit pupils at or proximate the eye of the user. Additionally, each of at least Q−1 of the Q output couplers in each of the P optical channels may be partially transmissive to transmit a respective portion of light from the projector through the optical waveguide towards at least one other one of the Q output couplers in the optical pathway or channel.

Figure 4:
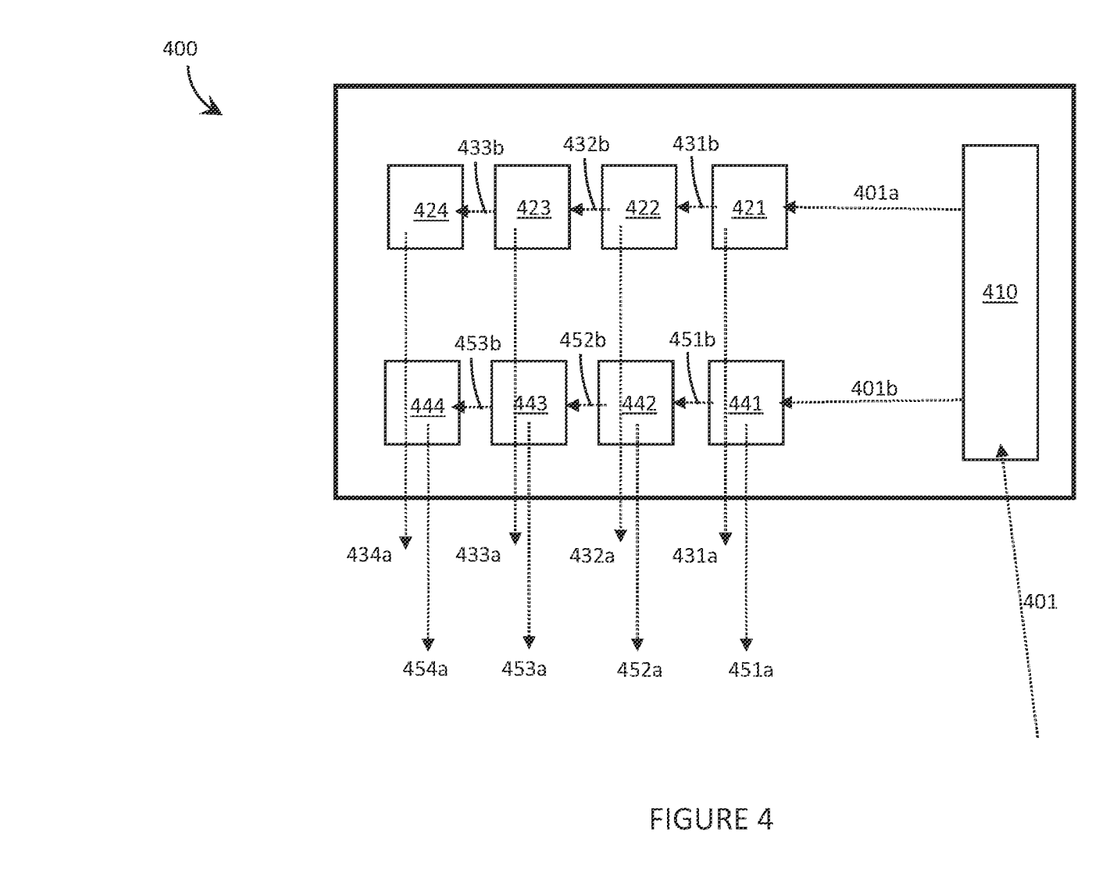
FIG. 4 is an illustrative diagram showing an example of an optical waveguide in accordance with the present systems, devices, and methods.

FIG. 4 is an illustrative diagram showing an example of optical waveguide 400 in accordance with the present systems devices, and methods. Optical waveguide 400 comprises N=8 discrete, spatially-separated output couplers arranged in an array of P=2 rows and Q=4 columns. Specifically, optical waveguide 300 includes an input coupler 410, a first "topmost" row of 4 discrete, spatially-separated output couplers 421, 422, 423, and 424, and a second "bottommost" row of discrete, spatially-separated output couplers 441, 442, 443, and 444.

Light 401 from a projector (not shown) is received by input coupler 410. A first portion 401a of light 401 is routed towards the topmost row of output couplers 421, 422, 423, and 424 and a second portion 401b of light 401 is routed towards the bottommost row of output couplers 441, 442, 443, and 444. This initial routing may be accomplished in a variety of different ways. As a first example, input coupler 410 may include beam splitters and/or partial reflectors (or custom optics such as gratings or holograms that provide beam splitting and/or partial reflection functionality) to essentially replicate light 401 and produce two copies 401a and 401b, each routed towards a respective row of output couplers. In this case, optical waveguide 400 provides a complete optical replication array with N=8 replicated copies of light 401 being output. Alternatively, as a second example, input coupler 410 may provide an optical splitter/divider functionality by routing a first range of light signals 401 (e.g., a first portion of the total scan range of a raster scanning projector) towards topmost row of output couplers 421, 422, 423, and 424 and routing a second range of light signals 401 (e.g., a second portion of the total scan range of a raster scanning projector) towards bottommost row of output couplers 441, 442, 443, and 444. Specifically, if the projector source of light 401 is a scanning laser projector that sweeps over a range of scan angles, input coupler 410 may receive light 401 over the entire sweep of scan angles from the projector and cause a first portion (e.g., half) of said sweep to route towards topmost row of output couplers 421, 422, 423, and 424 and a second portion (e.g., half) of said sweep towards bottommost row of output couplers 441, 442, 443, and 444. In this way, input coupler 410 essentially splits or divides light signals 401 from a projector into two ranges in a similar way to the optical splitter described in US 2016-0377866 A1.

Once light 401 has been replicated, split, or divided into P=2 portions, a first portion 401a is then replicated Q=4 times by output couplers 421, 422, 423, and 424 and a second portion 401b is replicated Q=4 times by output couplers 441, 442, 443, and 444. That is, output couplers 421, 422, 423, and 424 behave as a first optical waveguide replicator row similar to optical waveguide 300 from FIG. 3 and output couplers 441, 442, 443, and 444 behave as a second optical waveguide replicator row similar to optical waveguide 300 from FIG. 3.

Light 401a is guided (e.g., via total internal reflection) by optical waveguide 400 to first output coupler 421 which is partially reflective of light 401a and partially transmissive of light 401a. A first portion 431a of light 401a that is reflected by first output coupler 421 is out-coupled from optical waveguide 400 towards (either directly or via any number of intervening optics such as holographic combiner 260) a first exit pupil at or proximate the eye of the user while a second portion 431b of light 401a that is transmitted by first output coupler 421 is propagated (e.g., via total internal reflection) by optical waveguide 400 to second output coupler 422. Light 431b is guided (e.g., via total internal reflection) by optical waveguide 400 to second output coupler 422 which is partially reflective of light 431b and partially transmissive of light 431b. A first portion 432a of light 431b that is reflected by second output coupler 422 is out-coupled from optical waveguide 400 towards (either directly or via any number of intervening optics such as holographic combiner 260) a second exit pupil at or proximate the eye of the user while a second portion 432b of light 431b that is transmitted by second output coupler 422 is propagated (e.g., via total internal reflection) by optical waveguide 400 to third output coupler 423. Light 432b is guided (e.g., via total internal reflection) by optical waveguide 400 to third output coupler 423 which is partially reflective of light 432b and partially transmissive of light 432b. A first portion 433a of light 432b that is reflected by third output coupler 423 is out-coupled from optical waveguide 400 towards (either directly or via any number of intervening optics such as holographic combiner 260) a third exit pupil at or proximate the eye of the user while a second portion 433b of light 432b that is transmitted by third output coupler 423 is propagated (e.g., via total internal reflection) by optical waveguide 400 to fourth output coupler 424. Light 433b is guided (e.g., via total internal reflection) by optical waveguide 400 to fourth output coupler 424 which is at least partially reflective (may be fully reflective) of light 433b. At least a first portion 434a of light 433b that is reflected by fourth output coupler 424 is out-coupled from optical waveguide 400 towards (either directly or via any number of intervening optics such as holographic combiner 260) a fourth exit pupil at or proximate the eye of the user.

Light 401b is guided (e.g., via total internal reflection) by optical waveguide 400 to fifth output coupler 441 which is partially reflective of light 401b and partially transmissive of light 401b. A first portion 451a of light 401b that is reflected by fifth output coupler 441 is out-coupled from optical waveguide 400 towards (either directly or via any number of intervening optics such as holographic combiner 260) a fifth exit pupil at or proximate the eye of the user while a second portion 451b of light 401b that is transmitted by fifth output coupler 441 is propagated (e.g., via total internal reflection) by optical waveguide 400 to sixth output coupler 442. Light 451b is guided (e.g., via total internal reflection) by optical waveguide 400 to sixth output coupler 442 which is partially reflective of light 451b and partially transmissive of light 451b. A first portion 452a of light 451b that is reflected by sixth output couple 442 is out-coupled from optical waveguide 400 towards (either directly or via any number of intervening optics such as holographic combiner 260) a sixth exit pupil at or proximate the eye of the user while a second portion 452b of light 451b that is transmitted by sixth output coupler 442 is propagated (e.g., via total internal reflections by optical waveguide 400 to seventh output coupler 443. Light 452b is guided (e.g., via total internal reflection) by optical waveguide 400 to seventh output coupler 443 which is partially reflective of light 452b and partially transmissive of light 452b. A first portion 453a of light 452b that is reflected by seventh output coupler 443 is out-coupled from optical waveguide 400 towards (either directly or via any number of intervening optics such as holographic combiner 260) a seventh exit pupil at or proximate the eye of the user while a second portion 453b of light 452b that is transmitted by seventh output coupler 443 is propagated (e.g., via total internal reflection) by optical waveguide 400 to eighth output coupler 444. Light 453b is guided (e.g., via total internal reflection) by optical waveguide 400 to eighth output coupler 444 which is at least partially reflective (may be fully reflective) of light 453b. At least a first portion 454a of light 453b that is reflected by eighth output coupler 444 is out-coupled from optical waveguide 400 towards (either directly or via any number of intervening optics such as holographic combiner 260) an eighth exit pupil at or proximate the eye of the user.

As described previously, light that is "out-coupled towards an exit pupil" may be out-coupled to converge directly towards an exit pupil (e.g., with no intervening optics, where the output coupler itself may provide the converge function to the light, as in, for example, the case where the optical waveguide itself is carried by an eyeglass lens such as in FIG. 1), or tight that is "out-coupled towards an exit pupil" may be out-coupled towards a holographic combiner that receives the light and redirects it towards the corresponding exit pupil (as in, for example, the case where the optical waveguide itself is carried in an arm or temple of a support structure as in FIG. 2). In the latter configuration, the holographic combiner may impart the convergence function to the light upon redirection.

A person of skill in the art will appreciate that the input couplers and output couplers described throughout this specification and the appended claims may come in a variety of different forms, including without limitation: optical gratings, diffraction gratings, volume gratings, surface relief gratings, holograms, volume holograms, surface relief holograms, and/or any combination of the foregoing.

In some implementations, a single input coupler may be used to split/divide/replicate/direct light through an optical waveguide to any number of output couplers. In other implementations, multiple discrete, spatially-separated input couplers may be employed. For example, input coupler 410 in optical waveguide 400 may comprise two separate input couplers with a first input coupler operative to direct light 401a towards output couplers 421, 422, 423, and 424 and a second input coupler operative to direct light 401b towards output couplers 441, 442, 443, and 444.

A person of skill in the art will appreciate that the present systems, devices, and methods may be applied or otherwise incorporated into WHUD architectures that employ one or more transparent combiner(s) other than a holographic combiner. For example, in some implementations the holographic combiner described herein may be replaced by a non-holographic device that accomplishes substantially the same general function(s), such as prismatic film, a film that carries a microlens array, and/or a waveguide structure. Such non-holographic implementations may or may not employ additional optics. Unless the specific context requires otherwise, a person of skill in the art will appreciate that references to a "holographic combiner" throughout the present systems, devices, and methods are generic to other transparent combiners (combined with other optics, as necessary) that may be applied or adapted for application to accomplish the same general function(s) associated with the holographic combiners described herein.

A person of skill in the art will appreciate that the various embodiments for eyebox expansion by exit pupil replication described herein may be applied in non-WHUD applications. For example, the present systems, devices, and methods may be applied in non-wearable heads-up displays and/or in other projection displays, including virtual reality displays, in which the holographic combiner need not necessarily be transparent.

In binocular implementations (i.e., implementations in which display content is projected into both eyes of the user), the total field of view may be increased by deliberately projecting a different field of view to each eye of the user. The two fields of view may overlap, so that both eyes see content at the center of the field of view while the left eye sees more content at the left of the field of view and the right eye sees more content at the right of the field of view.

In some implementations that employ multiple exit pupils, all exit pupils may optionally be active at all times. Alternatively, implementations that also employ eye-tracking, may activate only the exit pupil that corresponds to where the user is looking (based on eye-tracking) while one or more exit pupil(s) that is/are outside of the user's field of view may be deactivated.

Eyebox expansion may advantageously enable a user to see displayed content while gazing in a wide range of directions. Furthermore, eyebox expansion may also enable a wider variety of users having a wider range of eye arrangements to adequately see displayed content via a given WHUD. Anatomical details such as interpupillary distance, eye shape, relative eye positions, and so on can all vary from user to user. The various eyebox expansion methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

When used herein in relation to a specified quantity, the term "about" generally means "±10%" unless the specific context requires otherwise.

Throughout this specification and the various exemplary embodiments described herein, reference is often made to a "projector." A person of skill in the art will appreciate that in some implementations of the present systems, devices, and methods a projector may include or be replaced by a micro-display.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/564,858, U.S. Provisional Patent Application Ser. No. 62/482,062 (now U.S. patent application Ser. Nos. 15/946,549, 15/946,557, 15/946,562, 15/946,565, and 15/946,569), US Patent Application Publication No. US 2016-0377865 A1, US Patent Application Publication No. US 2016-0377866 A1, US Patent Application Publication No. US 2016-0238845 A1, US Patent Application Publication No. US 2017-0212349 A1, US Patent Application Publication No. US 2016-0327797 A1, US Patent Application Publication No US 2016-0327796 A1, US Patent Application Publication No. US 2016-0349516 A1, US Patent Application Publication No. US 2017-0068095 A1, US Patent Application Publication No. US 2017-0212290 A1, US Patent Application Publication No. US 2017-0219829 A1, U.S. Provisional Patent Application Ser. No. 62/487,303, and U.S. Provisional Patent Application Ser. No. 62/534,099, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
an eyeglass lens positioned in a field of view of an eye of a user when the wearable heads-up display is worn on a head of the user;
a projector to project light, the projector carried by an arm portion of the wearable heads-up display; and
an optical waveguide carried by the wearable heads-up display and positioned at least partially within the field of view of the eye of the user when the wearable heads-up display is worn on the head of the user, wherein the optical waveguide comprises:
an input coupler configured to couple light from the projector into the optical waveguide; and
an N number of output couplers arranged in an array having P>1 rows and Q>1 columns, wherein each respective output coupler of the N number of output couplers is oriented to couple a respective portion of light from the projector out of the optical waveguide and direct the respective portion of light to a respective one of N exit pupils at or proximate the eye of the user.

2. The wearable heads-up display of claim 1, wherein:
each output coupler of the N number of output couplers is positioned within the field of view of the eye of the user when the wearable heads-up display is worn on the head of the user and oriented to converge the a respective portion of light directly towards a corresponding exit pupil at or proximate the eye of the user.

3. The wearable heads-up display of claim 2, wherein:
the projector is carried by an arm portion of the wearable heads-up display and oriented to project light from the arm portion of the wearable heads-up display through free space to impinge on the input coupler; and
the input coupler is configured to couple the light into the optical waveguide.

4. The wearable heads-up display of claim 3, wherein the input coupler is positioned within the field of view of the eye of the user when the wearable heads-up display is worn on the head of the user.

5. The wearable heads-up display of claim 1, wherein:
the optical waveguide is positioned and oriented to guide a first portion of light and a second portion of light towards a first output coupler of the N number of output couplers; and
the first output coupler of the N number of output couplers is oriented to redirect the second portion of light towards a second output coupler of the N number of output couplers through the optical waveguide.

6. The wearable heads-up display of claim 5, wherein the first output coupler is at least partially reflective of the first portion of light and at least partially transmissive of the second portion of light.

7. The wearable heads-up display of claim 1, wherein the optical waveguide is integrated with the eyeglass lens.

8. The wearable heads-up display of claim 1, wherein the optical waveguide includes at least one of an optical fiber or rectangular waveguide.

9. The wearable heads-up display of claim 1, wherein the optical waveguide includes a transparent material.

10. The wearable heads-up display of claim 1, wherein at least one of the input coupler and one or more output coupler of the N number of output couplers is selected from a group consisting of: an optical grating, a diffraction grating, a hologram, and a holographic optical element comprising at least two holograms.

11. The wearable heads-up display of claim 1, wherein:
the optical waveguide includes a first optical channel through which a first portion of light is guided towards a first output coupler of the N number of output couplers and a second optical channel through which a second portion of light is guided towards a second output coupler of the N number of output couplers; and
the first portion of light is not guided through the second optical channel and the second portion of light is not guided through the first optical channel.

12. The wearable heads-up display of claim 2, couple a respective portion of light from the projector out of the optical waveguide.

13. The wearable heads-up display of claim 12, wherein:
each output coupler in each respective one of the P rows of the N number of output couplers are arranged in a row; and
each of at least Q−1 output couplers in each of the P rows is partially transmissive to transmit a respective portion of light from the projector through the optical waveguide towards at least one other one of the Q output couplers in the row.

14. The wearable heads-up display of claim 13, wherein the optical waveguide includes P optical channels and each of the P rows corresponds to a respective one of the P optical channels.

15. The wearable heads-up display of claim 1, wherein the projector includes a scanning laser projector.

16. The wearable heads-up display of claim 1, wherein the wearable heads-up display has a general shape and appearance of an eyeglasses frame.

17. The wearable heads-up display of claim 1, wherein the input coupler is a first input coupler, and further comprising a second input coupler oriented to couple light from the projector into the optical waveguide, wherein the first input coupler is positioned and oriented to couple a first portion of light from the projector into the optical waveguide and direct the first portion of light from the projector towards a first output coupler of the N number of output couplers and the second input coupler is positioned and oriented to couple a second portion of light from the projector into the optical waveguide and direct the second portion of light from the projector towards a second output coupler of the N number of output couplers.

18. A method comprising:
positioning an eyeglass lens of a wearable heads-up display such that the eyeglass lens is in a field of view of an eye of a user when the wearable heads-up display is worn on a head of the user;
disposing a projector configured to project light on an arm portion of the wearable heads-up display such that the projector is carried by an arm portion of the wearable heads-up display; and
arranging an optical waveguide of a wearable heads-up display such that the optical waveguide is carried by the wearable heads-up display and positioned at least partially within the field of view of the eye of the user when the wearable heads-up display is worn on the head of the user, wherein the optical waveguide comprises:
an input coupler configured to couple light from the projector into the optical waveguide; and
an N number of output couplers arranged in an array having P>1 rows and Q>1 columns, wherein each respective output coupler of the N number of output couplers is oriented to couple a respective portion of light from the projector out of the optical waveguide and direct the respective portion of light to a respective one of N exit pupils at or proximate the eye of the user.

19. A wearable heads-up display comprising:
an eyeglass lens positioned in a field of view of an eye of a user when the wearable heads-up display is worn on a head of the user;
a projector to project light, the projector carried by an arm portion of the wearable heads-up display; and
an optical waveguide integrated with the eyeglass lens and positioned at least partially within the field of view of the eye of the user when the wearable heads-up display is worn on the head of the user, wherein the optical waveguide comprises:
an input coupler configured to couple light from the projector into the optical waveguide; and
an N number of output couplers arranged in an array having P>1 rows and Q>1 columns, wherein each respective output coupler of the N number of output couplers is oriented to couple a respective portion of light from the projector out of the optical waveguide and direct the respective portion of light to a respective one of N exit pupils at or proximate the eye of the user.

* * * * *

UNITED STATES PATENT AND TRADEMARK OFFICE
CERTIFICATE OF CORRECTION

| | |
|---|---|
| PATENT NO. | : 11,921,292 B2 |
| APPLICATION NO. | : 17/517290 |
| DATED | : March 5, 2024 |
| INVENTOR(S) | : Stuart James Myron Nicholson et al. |

It is certified that error appears in the above-identified patent and that said Letters Patent is hereby corrected as shown below:

In the Claims

At Column 20 Line 17, please correct "worn on a" to be --worn on the--

At Column 20 Line 39, please correct "converge the a" to be --converge a--

At Column 21 Line 22, please correct "claim 2, couple" to be --claim 2, wherein each output coupler of the N number of output couplers is at least partially reflective to couple--

At Column 22 Line 8, please correct "worn on a head" to be --worn on the head--

At Column 22 Line 34, please correct "worn on a head" to be --worn on the head--

Signed and Sealed this
Third Day of September, 2024

Katherine Kelly Vidal
*Director of the United States Patent and Trademark Office*